(12) United States Patent
Matsuura (10) Patent No.: US 10,690,537 B2
(45) Date of Patent: Jun. 23, 2020

(54) TEST RESULT EVALUATING METHOD AND MATERIAL TESTER

(71) Applicant: SHIMADZU CORPORATION, Kyoto (JP)

(72) Inventor: Tohru Matsuura, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 0 days.

(21) Appl. No.: 16/262,952

(22) Filed: Jan. 31, 2019

(65) Prior Publication Data

US 2019/0234793 A1    Aug. 1, 2019

(30) Foreign Application Priority Data

Feb. 1, 2018  (JP) ................. 2018-016576

(51) Int. Cl.
  *G01H 1/16*  (2006.01)
  *G01H 1/14*  (2006.01)
  (Continued)

(52) U.S. Cl.
  CPC .............. *G01H 1/16* (2013.01); *G01H 1/14* (2013.01); *G01M 1/14* (2013.01); *G01N 3/08* (2013.01); *G01N 3/30* (2013.01); *G01N 3/04* (2013.01); *G01N 2203/001* (2013.01); *G01N 2203/0017* (2013.01); *G01N 2203/0021* (2013.01); *G01N 2203/0048* (2013.01); *G01N 2203/0252* (2013.01); *G01N 2203/0676* (2013.01); *G01N 2203/0682* (2013.01); *G01N 2203/0688* (2013.01)

(58) Field of Classification Search
  CPC .. G01H 1/16; G01H 1/14; G01N 3/08; G01N 3/30; G01M 1/14
  See application file for complete search history.

(56) References Cited

U.S. PATENT DOCUMENTS

2017/0040913 A1* 2/2017 Bucher ............... H02N 11/002
2018/0259334 A1* 9/2018 Moriguchi ......... G01C 19/5677

FOREIGN PATENT DOCUMENTS

| JP | 2004333143 | 11/2004 |
|----|------------|---------|
| JP | 2004333221 | 11/2004 |
| JP | 2005172589 | 6/2005  |

OTHER PUBLICATIONS

"Search Report of Europe Counterpart Application", dated Jun. 26, 2019, p. 1-p. 9.

(Continued)

*Primary Examiner* — David Z Huang
(74) *Attorney, Agent, or Firm* — JCIPRNET (57) ABSTRACT

A test result evaluating method and a material tester are provided. A test result evaluating part includes a representative value calculating part that acquires a representative value of section data corresponding to one period of a natural vibration frequency from data of a time period representing a force applied to a test piece also including a natural vibration and a ratio calculating part that calculates a ratio between the representative value acquired by the representative value calculating part and a value based on an amplitude of the natural vibration. The representative value calculating part and the ratio calculating part are arranged in a test result evaluating part as programs realizing functions by operating an arithmetic operation device.

15 Claims, 10 Drawing Sheets

(51) Int. Cl.
    *G01M 1/14*     (2006.01)
    *G01N 3/30*     (2006.01)
    *G01N 3/08*     (2006.01)
    *G01N 3/04*     (2006.01)

(56) References Cited

OTHER PUBLICATIONS

Xinran Xiao, "Dynamic tensile testing of plastic materials," Polymer Testing, vol. 27, Sep. 2007, pp. 164-178.

* cited by examiner

TEST RESULT EVALUATING METHOD AND MATERIAL TESTER

CROSS-REFERENCE TO RELATED APPLICATION

This application claims the priority of Japan patent application serial no. 2018-016576, filed on Feb. 1, 2018. The entirety of the above-mentioned patent application is hereby incorporated by reference herein and made a part of this specification.

BACKGROUND

Technical Field

The disclosure relates to a test result evaluating method for evaluating the reliability of a test result in a material test applying a test force to a test subject and a material tester.

Description of Related Art

In order to evaluate the characteristics of materials, various material tests according to types and properties of materials are performed. A material tester executing a material test includes a load mechanism that applies a test force to a test piece that is a testing subject and a force detector that is used for detecting a force applied to the test piece in the execution thereof (see Patent Documents 1 and 2).

[Patent Document 1] Japanese Laid-Open No. 2004-333221
[Patent Document 2] Japanese Laid-Open No. 2004-333143

In a high-speed tension test or a punching test, there are cases in which a shock of breaking or destruction of a test piece reaches the whole tester (a system including a jig and a force detector), and an amplitude according to a natural vibration of a defective tester main body is superimposed on a waveform of test data based on detection performed by the force detector. Particularly, in a high-speed tension test, data is sampled over a short time interval that is $1/1000$ to $1/10000$ times that of a general tension test (for example, an interval of several hundred nanoseconds), and thus, superimposition of a natural vibration on test data may easily appear in a data waveform. In a case in which an excessive amplitude according to a natural vibration is superimposed on test data before a test piece breaks after starting of a test, the waveform represents a force that is actually applied to the test piece, and thus the reliability of a test result is degraded.

In addition, although a degree of amplitude of a natural vibration superimposed on test data is known, a degree of amplitude with respect to a test force applied to a test piece according to set test conditions or determination of whether a test result is reliable depends on a user's individual judgment. For this reason, a quantitative guide for executing a more objective evaluation of the reliability of a test result is requested.

SUMMARY

A disclosure according to a first aspect of the disclosure is a test result evaluating method for evaluating a reliability of a test result in a material test in which a test force is applied to a test subject by driving a load mechanism. The test result evaluating method includes: a representative value calculating process of calculating a representative value of section data by setting data corresponding to a predetermined time in data of a time period in which there is a state in which a test force is being applied to a test subject in test data based on a signal detected by a force detector as the section data; and a ratio calculating process of calculating a load natural vibration amplitude ratio that is a ratio between the representative value acquired in the representative value calculating process and a value based on an amplitude of a natural vibration.

A disclosure according to an eighth aspect of the disclosure is a material tester including a control device that processes a signal detected by a force detector in a material test in which a test force is applied to a test subject by driving a load mechanism, the control device including a test result evaluating part including: a representative value calculating part calculating a representative value of section data by setting data corresponding to a predetermined time in data of a time period that is in a state in which the test force is applied to the test subject in test data based on a signal detected by a force detector as the section data; and a ratio calculating part calculating a load natural vibration amplitude ratio that is a ratio between the representative value acquired by the representative value calculating part and a value based on an amplitude of a natural vibration.

DESCRIPTION OF THE EMBODIMENTS

The disclosure provides a test result evaluating method and a material tester enabling a user to quantitatively acquire the reliability of a test result.

A disclosure according to a second aspect of the disclosure, is the test result evaluating method according to the first aspect of the disclosure, further including a determination process of determining reliability of the test result on the basis of the load natural vibration amplitude ratio.

According to a disclosure according to a third aspect of the disclosure, in the test result evaluating method according to the first aspect or the second aspect of the disclosure, the section data is data corresponding to a time of one period of natural vibration superimposed on the test data.

According to a disclosure according to a fourth aspect of the disclosure, in the test result evaluating method according to any one of the first aspect to the third aspect of the disclosure, in the representative value calculating process, representative values of a plurality of pieces of section data are calculated, and in the determination process, determination is executed on the basis of the load natural vibration amplitude ratio for each of the plurality of pieces of section data of which the representative values are calculated in the representative value calculating process, and comprehensive determination is executed using determination for each of the plurality of pieces of section data.

A disclosure according to a fifth aspect of the disclosure, in the test result evaluating method according to any one of the first aspect to the fourth aspect of the disclosure, further includes: an amplitude detecting process of calculating a value based on the amplitude of the natural vibration before the ratio calculating process.

A disclosure according to a sixth aspect of the disclosure, in the test result evaluating method according to any one of the first aspect to the fifth aspect of the disclosure, further includes: a natural vibration frequency calculating process of acquiring a natural vibration frequency from the test data before the representative value calculating process.

A disclosure according to a seventh aspect of the disclosure, in the test result evaluating method according to the third aspect of the disclosure, further includes: a period determining process of acquiring one period of a waveform of the natural vibration from the reciprocal of the natural vibration frequency superimposed on the test data before the representative value calculating process.

According to a disclosure according to a ninth aspect of the disclosure, in the material tester according to the eighth aspect of the disclosure, the test result evaluating part further includes a determination part determining reliability of the test result on the basis of the load natural vibration amplitude ratio.

According to a disclosure according to a tenth aspect of the disclosure, in the material tester according to the eighth aspect or the ninth aspect of the disclosure, the section data is data corresponding to a time of one period of the natural vibration superimposed on the test data.

According to a disclosure according to a eleventh aspect of the disclosure, in the material tester according to any one of the eighth aspect to the tenth aspect of the disclosure, the representative value calculating part calculates representative values of a plurality of pieces of section data, and the determination part executes determination on the basis of the load natural vibration amplitude ratio for each of the plurality of pieces of section data of which the representative values are calculated by the representative value calculating part and executes comprehensive determination using determination for each of the plurality of pieces of section data.

According to a disclosure according to a twelfth aspect of the disclosure, in the material tester according to any one of the eighth aspect to the eleventh aspect of the disclosure, the test result evaluating part further includes an amplitude detecting part calculating a value based on the amplitude of the natural vibration.

According to a disclosure according to a thirteenth aspect of the disclosure, in the material tester according to any one of the eighth aspect to the twelfth aspect of the disclosure, the control device further includes a natural vibration frequency calculating part acquiring a natural vibration frequency from the test data.

According to a disclosure according to a fourteenth aspect of the disclosure, in the material tester according to the tenth aspect, the test result evaluating part further includes a period determining part acquiring one period of a waveform of the natural vibration from the reciprocal of the natural vibration frequency superimposed on the test data.

According to the disclosures of the first aspect to the fourteenth aspect of the disclosure, a representative value of section data corresponding to one period of the natural vibration superimposed on the test data is calculated, and a ratio between the representative value and a value based on the amplitude of the natural vibration (load natural vibration amplitude ratio) is calculated, whereby a ratio of the natural vibration superimposed on actual test data for a test subject in accordance with the natural vibration of a load planned as a test can be quantitatively acquired. The user can quantitatively ascertain the reliability of test results according to indices for evaluating the test results quantified in this manner being shown.

According to the disclosures of the second aspect and the ninth aspect, determination for the reliability of a test result is executed on the basis of a ratio between a representative value and a value based on the amplitude of the natural vibration (load natural vibration amplitude ratio), and accordingly, individual differences in the determination do not occur between users. A user can execute an evaluation of the reliability of a test result more objectively.

According to the disclosures of the fifth aspect and the twelfth aspect, by calculating a value based on the amplitude of the natural vibration, the value based on the amplitude of the natural vibration can be quantitatively acquired from test data independently of a user's manual operation.

According to the disclosures of the sixth aspect and the thirteenth aspect, by calculating a natural vibration frequency from test data, a natural vibration frequency of a system including a jig and a force detector need not be checked in advance using another vibration detecting device. Another vibration detection device does not need to be provided, which is economical, and a user's operation time can be shortened.

Figure 1:
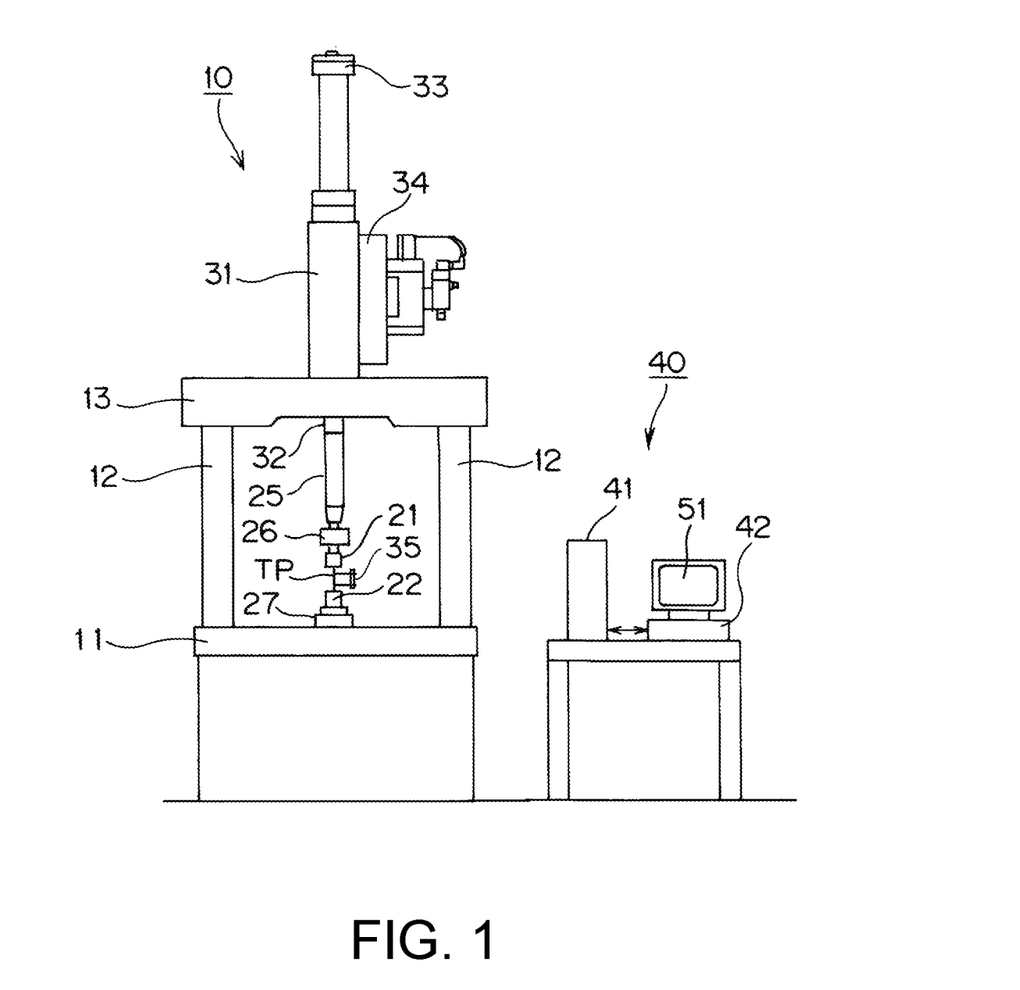
FIG. 1 is a diagram illustrating an overview of a material tester according to the disclosure.
Figure 2:
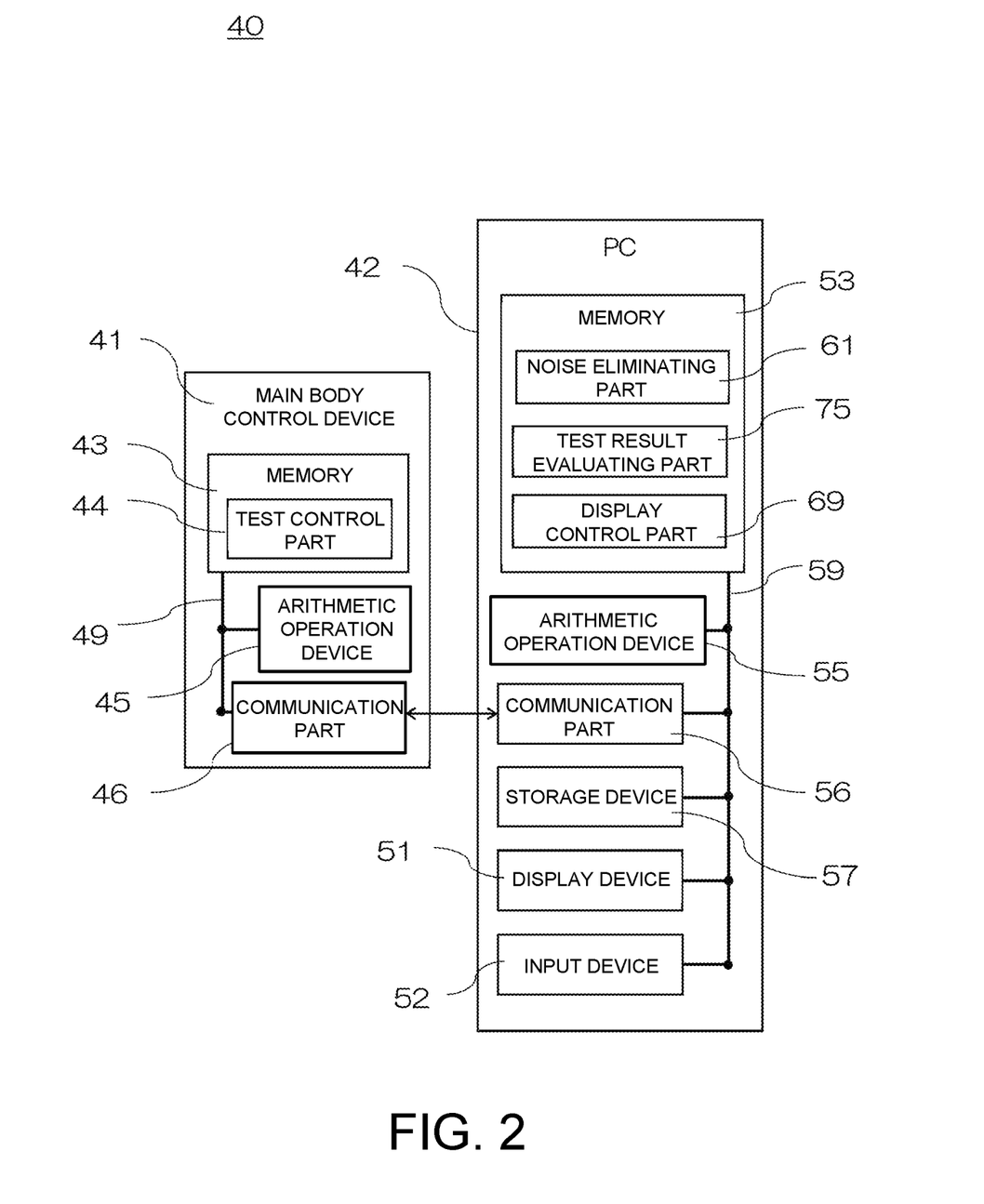
FIG. 2 is a block diagram illustrating a main control system of a material tester according to the disclosure.

Hereinafter, embodiments of the disclosure will be described with reference to the drawings. FIG. 1 is a diagram illustrating an overview of a material tester according to the disclosure. FIG. 2 is a block diagram illustrating a main control system of the material tester according to the disclosure.

This material tester executes a high-speed tension test of rapidly applying a shocking tensile force to a test piece TP and includes a tester main body 10 and a control device 40. The tester main body 10 includes a table 11, one pair of support posts 12 erected on the table 11, a cross yoke 13 stretched over the one pair of support posts 12, and a hydraulic cylinder 31 fixed to the cross yoke 13.

The hydraulic cylinder 31 is connected to a hydraulic power source (not illustrated in the drawing) disposed inside the table 11 through a servo valve 34 and operates in accordance with a hydraulic oil supplied from the hydraulic power source. An upper chuck 21 is connected to a piston rod 32 of the hydraulic cylinder 31 through a run-up jig 25 and a joint 26. Meanwhile, a lower chuck 22 is connected to the table 11 through a load cell 27 that is a force detector. In this way, the configuration of this tester main body 10 is a configuration for executing a tension test for rapidly separating one pair of chucks, which grip both end portions of the test piece TP, away from each other by disposing a run-up section in a pulling direction using the run-up jig 25 and lifting a piston rod 32 at a high speed of 0.1 to 20 m/s. A displacement (stroke) of a load mechanism at the time of execution of a tension test, in other words, a moving amount of the piston rod 32 is detected by a stroke sensor 33, and a test force at that time is detected by the load cell 27.

In addition, an extensometer 35 is disposed on the test piece TP. The extensometer 35 is directly attached to a test piece TP for measuring the expansion of the test piece TP and, for example, has a structure as disclosed in Japanese Unexamined Patent Application Publication No. 2006-10409. In other words, fixing tools respectively fixed to marked lines at two positions set in the test piece TP, a pipe formed from a conductor fixed to one fixing tool, and a coil inserted into the inside of a pipe fixed to the other fixing tool to be movable are included, and a change in inductance of a coil based on a change in the amount of insertion of the coil with respect to the pipe is detected, and an expansion of the test piece TP between the marked lines is measured. In addition, for detection of a displacement occurring in a test subject, a signal of the stroke sensor 33 may be used, or the displacement may be measured using a non-contact type extensometer such as a high-speed video camera.

The control device 40 is composed of a main body control device 41 used for controlling the operation of the tester main body 10 and a personal computer 42. The main body control device 41 includes a memory 43 that stores a program, an arithmetic operation device 45 such as a micro processing unit (MPU) that executes various arithmetic operations, and a communication part 46 that communicates with the personal computer 42. The memory 43, the arithmetic operation device 45, and the communication part 46 are interconnected through a bus 49. In addition, the main body control device 41 includes a test control part 44 as a functional component. The test control part 44 is stored in the memory 43 as a test control program. In a case in which a high-speed tension test is executed, by executing the test control program, a control signal is supplied to the servo valve 34, and the hydraulic cylinder 31 operates. Signal input/output parts respectively corresponding to the load cell 27, the stroke sensor 33, and the extensometer 35 are disposed in the main body control device 41, and an output signal of the load cell 27, an output signal of the stroke sensor 33, and an output signal of the extensometer 35 are digitalized and are taken in by the main body control device 41 at predetermined time intervals.

The personal computer 42 includes a ROM that stores a data analysis program, a memory 53 formed by a RAM that loads a program and temporarily stores data at the time of execution of a program and the like, an arithmetic operation device 55 such as a central processing unit (CPU) executing various arithmetic operations, a communication part 56 that communicates with an externally-connected device such as the main body control device 41, a storage device 57 that stores data, a display device 51 on which a test result is displayed, and an input device 52 that is used for inputting test conditions. A program realizing a function by operating the arithmetic operation device 55 is stored in the memory 53. In addition, the storage device 57 is configured as a large-capacity storage device such as a hard disk drive (HDD) and stores time series data that is a raw data of a test force input from the load cell 27 and the like. The memory 53, the arithmetic operation device 55, the communication part 56, the storage device 57, the display device 51, and the input device 52 are interconnected through a bus 59.

In FIG. 2, programs that are installed in the personal computer 42 and are stored in the memory 53 are illustrated as functional blocks. In this embodiment, a noise eliminating part 61 that eliminates noise components from data input from the detector, a test result evaluating part 75 that evaluates a test result, and a display control part 69 that controls display of a test result on the display device 51 are provided as functional blocks. In addition, the noise eliminating part 61 includes a measurement noise eliminating part 72 that eliminates measurement noise originating from a detector such as electrical fluctuation of detectors of the load cell 27 and the extensometer 35 to be described later and a vibration noise eliminating part 74 that eliminates vibration noise assumed to be caused by an inertial force according to natural vibration of the entire tester due to the impact of breakage or destruction of the test piece TP as functional blocks.

Figure 3:
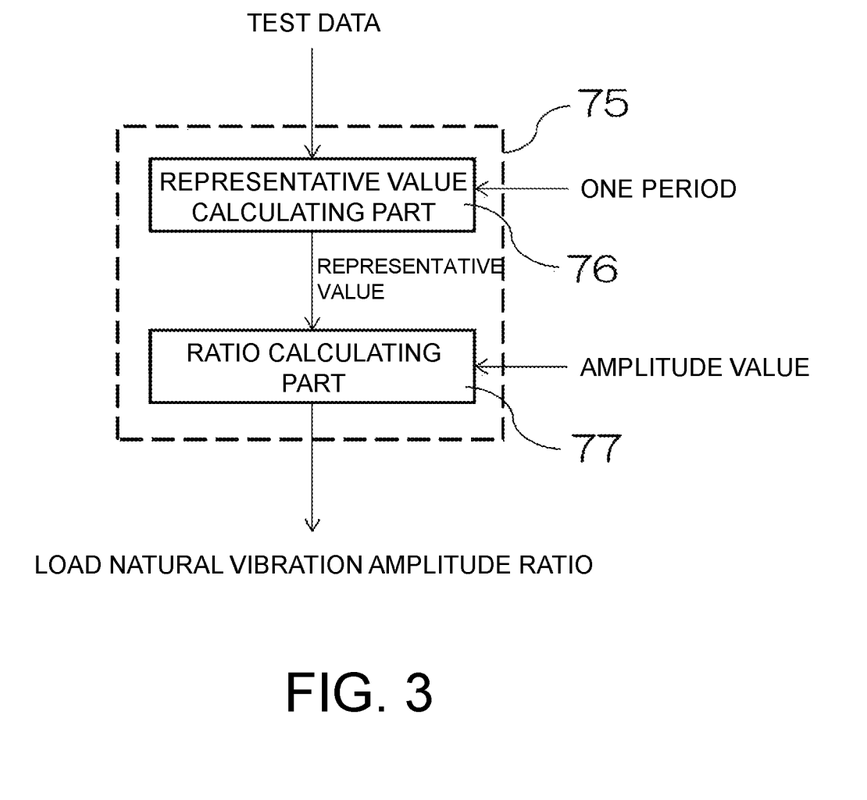
FIG. 3 is a flowchart illustrating a test result evaluating method according to a first embodiment.
Figure 4:
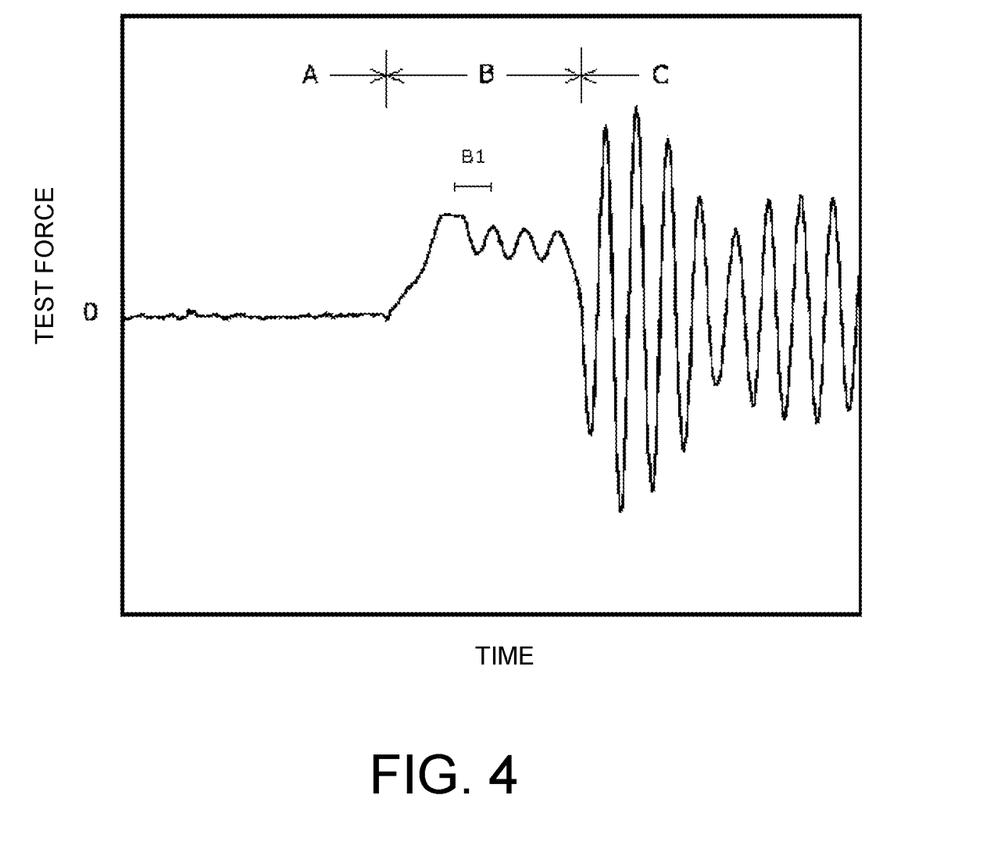
FIG. 4 is a test force-time graph representing test data.

A test result evaluating method according to the disclosure will be described in which whether a force applied to a test piece TP including a natural vibration is allowed as a test force intended to be used in a test, and the test result is reliable are evaluated from a test result acquired when a high-speed tension test is executed using a material tester having such a configuration. FIG. 3 is a flowchart illustrating an overview of a test result evaluating method according to a first embodiment. FIG. 4 is a test force-time graph representing test data. In the graph, the vertical axis represents a test force, and the horizontal axis represents time.

When a high-speed tension test (for example, a test speed of 20 m/s) is executed, raw data, which is acquired using the load cell 27, corresponding to a predetermined time period including before and after a time at which a test force is actually applied to the test piece TP is collected at a predetermined sampling rate (for example, at intervals of several hundreds of nano seconds) and is stored in the storage device 57 as time series data. Test data used for an evaluation of a test result is that of a data period B that is data of a time period in a state in which a test force is applied to a test piece TP in data of three time periods including A: before the starting of a test at which the test force starts to be applied to a test piece, B: between a time point of starting of testing and a breaking point at which the test piece breaks in a state in which a test force is being applied to the test piece, and C: after the breaking point of the test piece illustrated in FIG. 4.

The test result evaluating part 75 includes a representative value calculating part 76 that sets data corresponding to a predetermined time from data of a time period representing a force applied to the test piece TP, which also includes a natural vibration, as section data and acquires a representative value in the section data and a ratio calculating part 77 that calculates a ratio between the representative value acquired by the representative value calculating part 76 and a value based on the amplitude of the natural vibration. The representative value calculating part 76 and the ratio calculating part 77 are disposed in the test result evaluating part 75 as programs realizing functions due to operation of the arithmetic operation device 55. Further, the arithmetic operation device 55 reads the programs from the representative value calculating part 76 and the ratio calculating part 77 and executes a representative value calculating process and a ratio calculating process, whereby the functions are realized.

As the data corresponding to a predetermined time set as section data according to the disclosure, for example, data of the data period B that is in a state in which a test force is applied to a test piece, illustrated in FIG. 4, may be set as one piece of section data, or data corresponding to one period according to a natural vibration frequency in the data of the data period B, as denoted by reference sign B1 in FIG. 4, may be set as one piece of section data. In addition, data of the data period B that is equally divided into four parts or the like may be set as section data.

A representative value in section data according to the disclosure is a value representing the section such as an average value, a moving average value, a median value, or a maximum value of the section data. For example, in a case in which section data is fixed to one period of a natural vibration, as a representative value at that time, an average value of a test force in one period of the vibration or a maximum value that is a peak value may be used. In addition, the value based on the amplitude of a natural vibration may be a numerical value of the amplitude of the natural vibration superimposed on the test data of the data period B or a difference between a peak value and an average value in the section data. Alternatively, any other numeral value derived from the amplitude may be used.

One period of a natural vibration used for fixing section data used for calculating a representative value using the representative value calculating part 76 is acquired as the reciprocal of the frequency of the natural vibration. As the frequency of a natural vibration, for example, a frequency acquired using another vibration detecting device not illustrated in the drawing by hitting the lower chuck 22 connected to the load cell 27 with a hammer or the like may be stored in the storage device 57 in advance, or a frequency acquired through a Fourier transform using the data of the data period C (see FIG. 4) in which a large vibration according to an impact of breakage of a test piece TP appears may be stored in the storage device 57.

In order to quantitatively represent a degree of change in the load applied to the test piece that is caused by the amplitude of a natural vibration occurring in accordance with pull-up of the piston rod 32 for applying a test force to the test piece TP, the ratio calculating part 77 according to this embodiment calculates a ratio between the representative value of the load of the section data and the amplitude of the natural vibration (hereinafter, referred to as a load natural vibration amplitude ratio). The load natural vibration amplitude ratio representing a ratio of the amplitude of a natural vibration to the representative value of the load derived in this way is displayed in the display device 51 in accordance with an operation of the display control part 69 and is provided for a user as information. The load natural vibration amplitude ratio is defined using the following Equation (1).

$$\text{load natural vibration amplitude ratio} = \text{amplitude of natural vibration} / \text{representative value} \quad (1)$$

Figure 5:
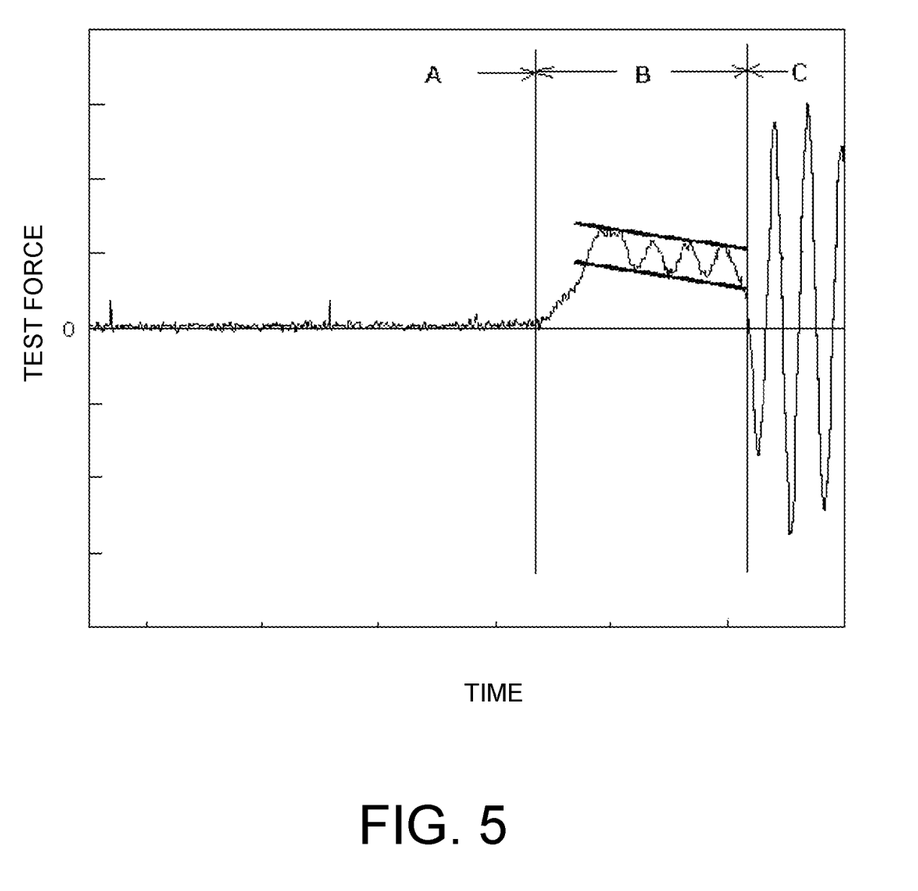
FIG. 5 is a test force-time graph illustrating amplitude detection.

FIG. 5 is a test force-time graph illustrating amplitude detection according to the first embodiment.

A numerical value of the amplitude of a natural vibration that is required for the ratio calculating part 77 to acquire the load natural vibration amplitude ratio is stored in the storage device 57 in advance. For example, a user may extract raw data stored in the storage device 57 of a material tester which is a result of the test, print a test force-time graph as illustrated in FIG. 5, and acquire a straight line joining upper peak values of the waveform of the data period B and a straight line joining lower peak values on the printed graph. Thereafter, an approximate amplitude is calculated from a width between the upper and lower straight lines, and a value thereof is stored in the storage device 57.

Figure 6:
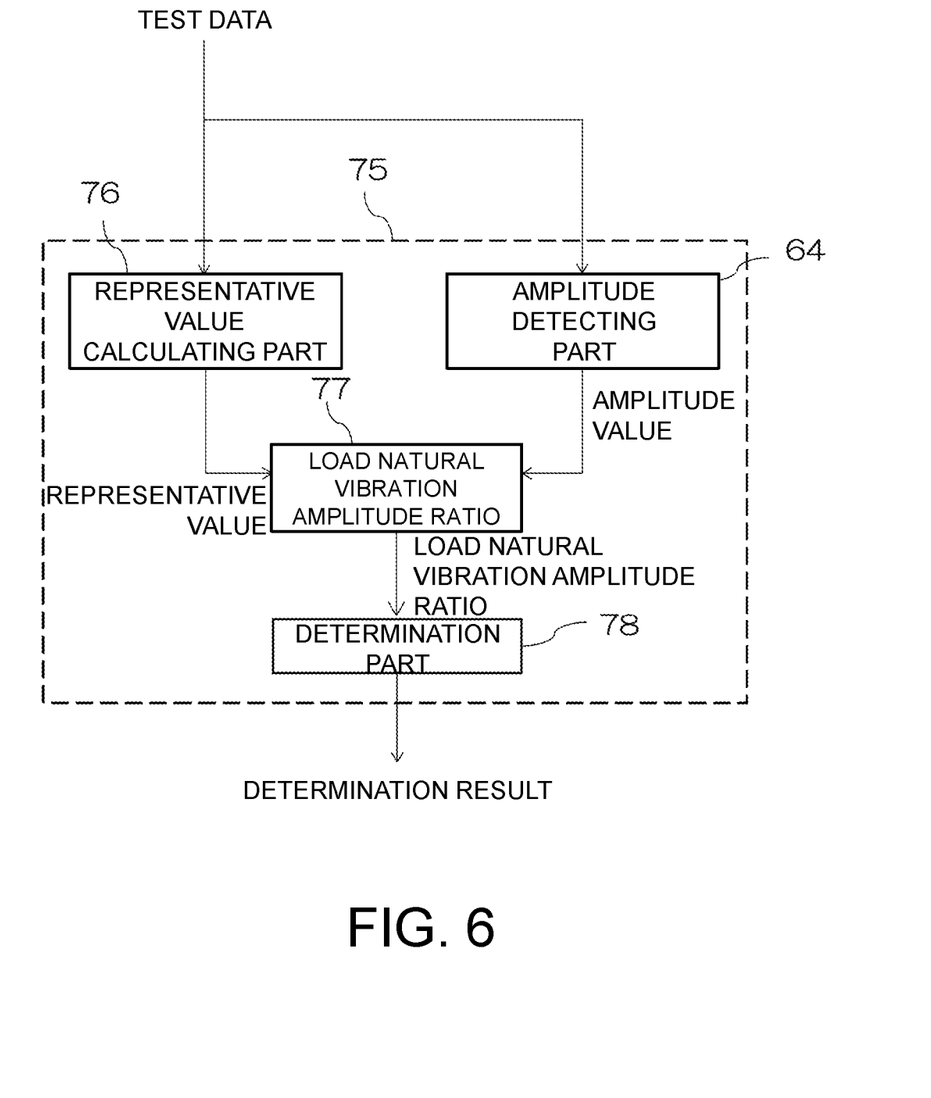
FIG. 6 is a flowchart illustrating a test result evaluating method according to a second embodiment.

Next, a test result evaluating method according to another embodiment will be described. FIG. 6 is a flowchart illustrating a test result evaluating method according to a second embodiment. The same reference sign will be assigned to components similar to those of the first embodiment, and detailed description thereof will not be presented.

This embodiment includes an amplitude detecting part 64 that calculates an amplitude of a natural vibration superimposed in the data period B (see FIG. 4) and a determination part 78 that determines reliability of a test result on the basis of the load natural vibration amplitude ratio calculated by the ratio calculating part 77. The amplitude detecting part 64 and the determination part 78 are arranged in the test result evaluating part 75 as a program that realizes a function by operating the arithmetic operation device 55. Then, the arithmetic operation device 55 reads programs from the amplitude detecting part 64 and the determination part 78 and executes an amplitude detecting process and a determination process, whereby the functions are realized. In other words, in this embodiment, instead of acquiring the amplitude of a natural vibration through a user's manual operation as in the first embodiment, the amplitude is automatically detected from test data. Therefore, it is possible to quantitatively determine the amplitude of a natural vibration applied to the test piece TP superimposed on a test force set for a test independently of visual observation of a user.

Figure 7:
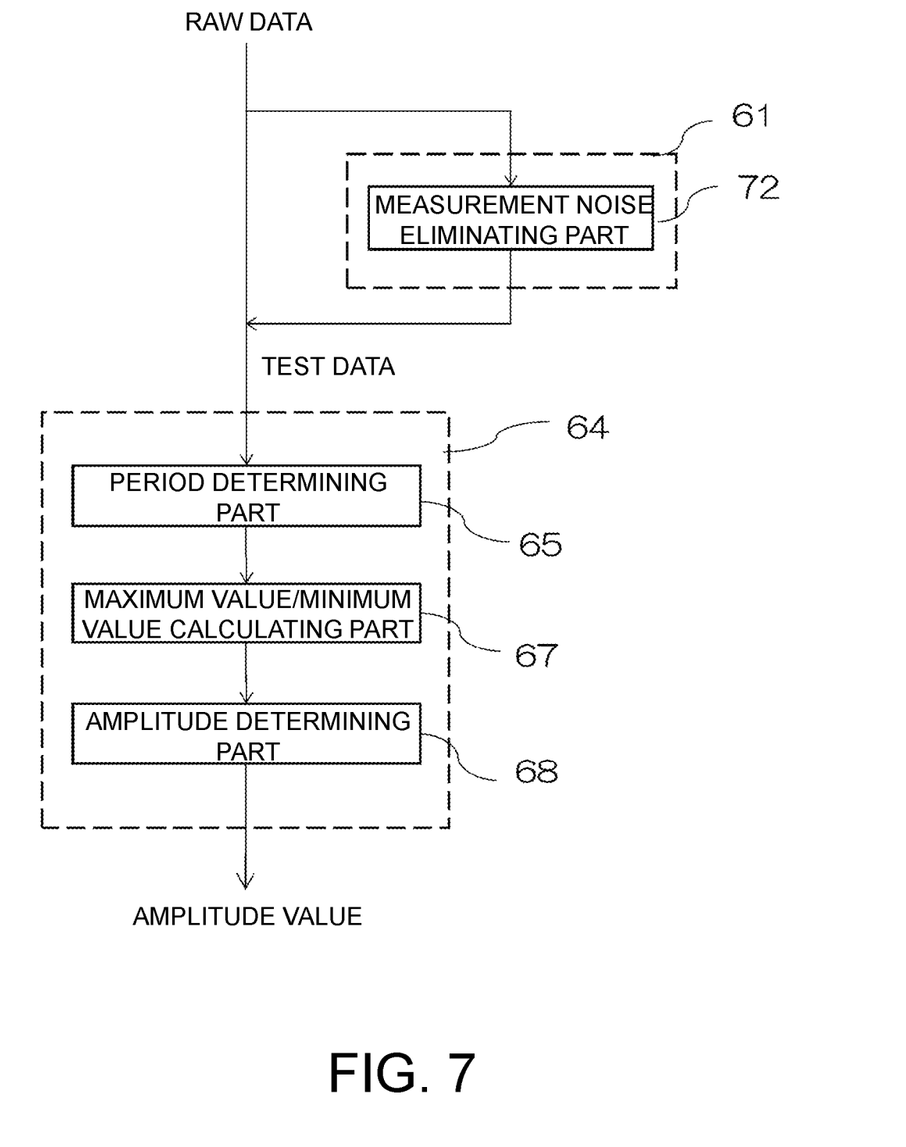
FIG. 7 is a flowchart illustrating amplitude detection executed by an amplitude detecting part 64.
Figure 8:
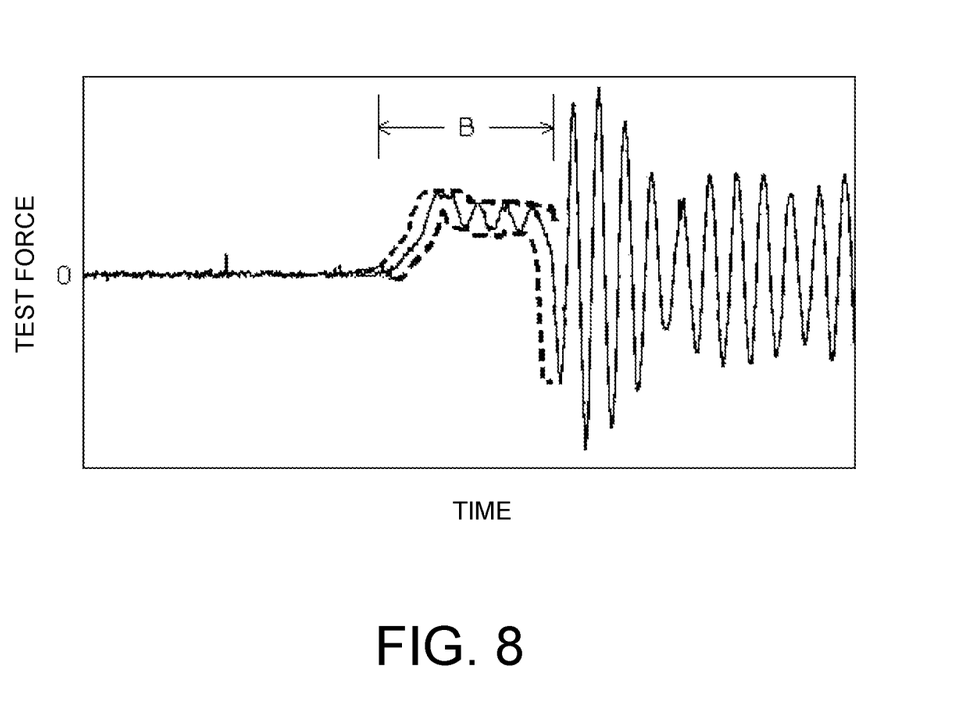
FIG. 8 is a test force-time graph illustrating amplitude detection executed by the amplitude detecting part 64.

FIG. 7 is a flowchart illustrating amplitude detection executed by the amplitude detecting part 64. FIG. 8 is a test force-time graph illustrating amplitude detection executed by the amplitude detecting part 64. In the graph, the vertical axis represents a test force, and the horizontal axis represents time. In the graph illustrated in FIG. 8, raw data from which measurement noise has not been eliminated is denoted by a solid line.

This amplitude detecting part 64 acquires the amplitude of a natural vibration that is superimposed on the test data of the data period B. Test data used for amplitude detection may be either data from which measurement noise has been eliminated by a measurement noise eliminating part 72 of the noise eliminating part 61 or raw data from which noise has not been eliminated. The measurement noise eliminating part 72 is configured as a noise cutting filter that eliminates a measurement noise frequency. As the measurement noise frequency, a frequency acquired by using data collected for verifying the state of the load cell 27 in advance before a test may be stored in the storage device 57, or a frequency acquired using the raw data of the data period A before a time point of test starting may be stored in the storage device 57.

The amplitude detecting part 64 includes a period determining part 65, a maximum value/minimum value calculating part 67, and an amplitude determining part 68. The amplitude detection in the data period B is realized by the arithmetic operation device 55 that reads programs from the period determining part 65, the maximum value/minimum value calculating part 67, and the amplitude determining part 68 of the amplitude detecting part 64 of the memory 53 and executes a period determining process, a maximum/minimum value calculating process, and an amplitude determining process.

When test data is input to the amplitude detecting part 64, the period determining part 65 acquires one period of the waveform of a natural vibration from the reciprocal of the natural vibration frequency. A natural vibration frequency used when one period is acquired may be acquired by another vibration detecting device in advance and stored in the storage device 57 or may be acquired by executing a Fourier transform using the data of the data period C after the breaking point.

When one period of the waveform of the natural vibration is acquired by the period determining part 65, the maximum value/minimum value calculating part 67 calculates a maximum value and a minimum value in a time interval while moving the time interval on the data of the data period B at predetermined time intervals with reference to a time interval of one period of the waveform of the natural vibration.

Here, moving on the data of the data period B at predetermined time intervals, for example, represents that an operation of sliding a time interval on the data at an interval of five sampling points is repeated by assuming that there are 100 data points in the time interval of one period and an area for the calculation of a maximum value and a minimum value is moved with the time interval maintained. The maximum value and the minimum value acquired in this way are denoted by broken lines in FIG. 8.

The amplitude determining part 68 calculates a difference between the maximum value and the minimum value (the maximum value−the minimum value) denoted by the broken lines in FIG. 8. A value of the difference between the maximum value and the minimum value corresponds to a wave height of the waveform of a vibration having a natural cycle that is superimposed on the test data of the data period B, and a value that is ½ of this value is the amplitude of the natural vibration. An amplitude value determined by the amplitude determining part 68 in this way is used for calculating a load natural vibration amplitude ratio using the ratio calculating part 77. In addition, the amplitude value is displayed in the display device 51 in accordance with an operation of the display control part 69.

Figure 9:
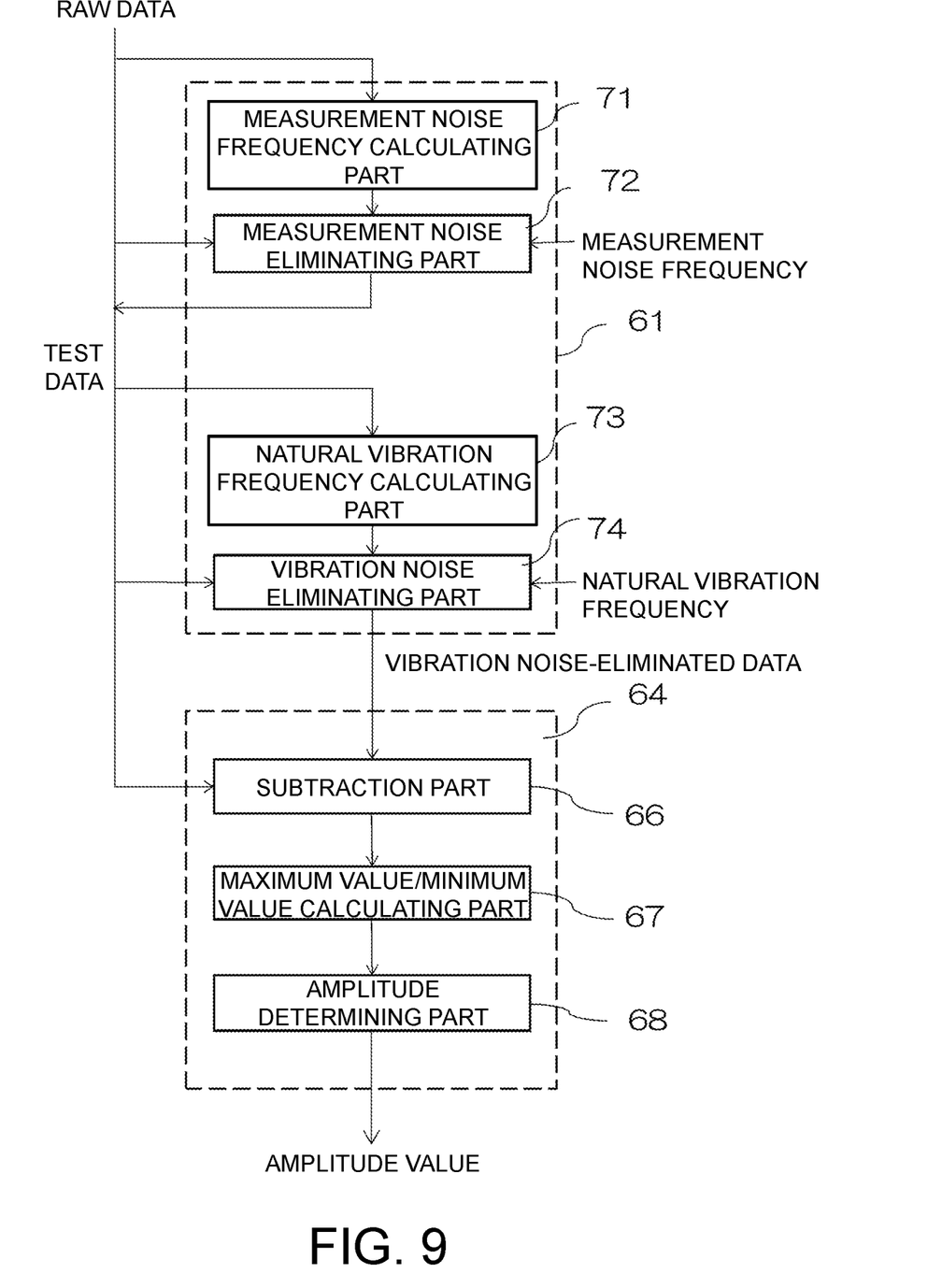
FIG. 9 is a flowchart illustrating another amplitude detection executed by the amplitude detecting part 64.
Figure 10:
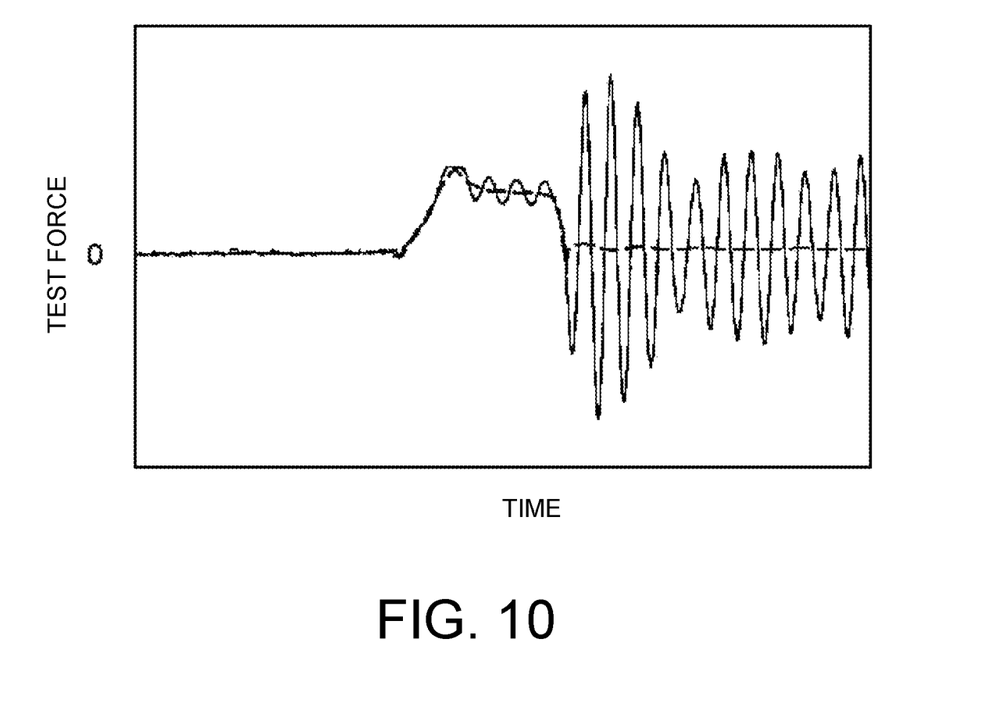
FIG. 10 is a test force-time graph illustrating another amplitude detection executed by the amplitude detecting part 64.
Figure 11:
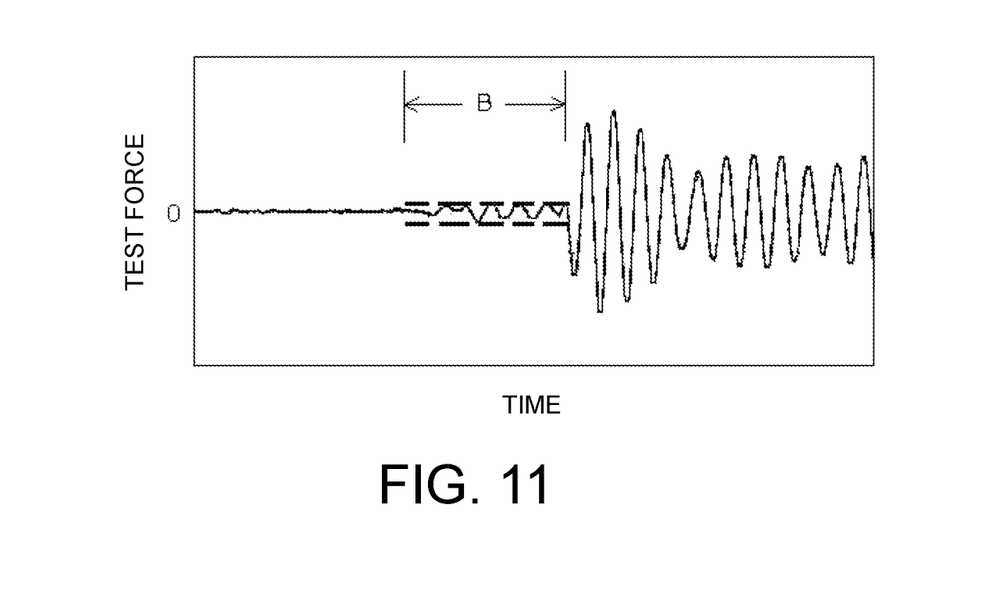
FIG. 11 is a test force-time graph illustrating another amplitude detection executed by the amplitude detecting part 64.

Next, another method of detecting an amplitude will be described. FIG. 9 is a flowchart illustrating another method of detecting an amplitude, and FIGS. 10 and 11 are test force-time graphs. In the graphs, the vertical axis represents a test force, and the horizontal axis represents time.

In this embodiment, the noise eliminating part 61 includes a measurement noise frequency calculating part 71, a measurement noise eliminating part 72, a natural vibration frequency calculating part 73, and a vibration noise eliminating part 74. In this embodiment, by using the raw data of the data period A before the starting of a test, a measurement noise frequency can be acquired for each test by the operation of the measurement noise frequency calculating part 71. In addition, by using the data of the data period C after the breaking of the test piece TP, a natural vibration frequency can be acquired for each test in accordance with an operation of the natural vibration frequency calculating part 73. In addition, raw data may be directly used as test data for amplitude detection without performing measurement noise elimination. Furthermore, as the measurement noise frequency required for configuring a noise cutoff filter in the measurement noise eliminating part 72, a measurement noise frequency that is acquired using another method and stored in the storage device 57 in advance may be used. Also in the vibration noise eliminating part 74, as the natural vibration frequency used for configuring a low pass filter for eliminating vibration noise, a frequency acquired by another vibration detecting device in advance and is stored in the storage device 57 may be used.

In this embodiment, vibration noise-eliminated data in which a natural vibration has been eliminated is used for amplitude detection. The arithmetic operation device 55 reads a program from the vibration noise eliminating part 63 of the memory 53, and vibration noise-eliminated data acquired by eliminating a natural vibration from test data is acquired. In the graph illustrated in FIG. 10, test data is denoted by a solid line, and vibration noise-eliminated data is denoted by a broken line.

In this embodiment, the amplitude detecting part 64 includes a subtraction part 66, a maximum value/minimum value calculating part 67, and the amplitude determining part 68. The amplitude detection in the data period B is realized by an arithmetic operation device 55 that reads programs from the subtraction part 66, the maximum value/ minimum value calculating part 67, and the amplitude determining part 68 of the amplitude detecting part 64 of the memory 53 and executes a subtraction process, a maximum value/minimum value calculating process, and an amplitude determining process.

When the test data and the vibration noise-eliminated data are input to the amplitude detecting part 64, the subtraction part 66 subtracts the vibration noise-eliminated data from the test data in the data period B. Then, the test data in the data period B, as illustrated in FIG. 11, is converted into a waveform having an amplitude of which upper and lower widths having the test force of zero as its center are the same.

The maximum value/minimum value calculating part 67 acquires a maximum value and a minimum value of the subtraction data of the data period B acquired by an operation of the subtraction part 66. In the graph illustrated in FIG. 11, maximum values and minimum values acquired by an operation of the maximum value/minimum value calculating part 67 are denoted by broken lines.

The amplitude determining part 68 calculates a difference between the maximum value and the minimum value denoted by broken lines in FIG. 11 (the maximum value−the minimum value). A value of the difference between the maximum value and the minimum value corresponds to a wave height of the vibration waveform having a natural cycle that is superimposed on the test data of the data period B, and a value that is ½ of this value is an amplitude of the natural vibration. The amplitude value determined by the amplitude determining part 68 in this way is used for calculating a load natural vibration amplitude ratio using the ratio calculating part 77. In addition, the amplitude value is displayed on the display device 51 by an operation of the display control part 69.

In addition, as in this embodiment, by further arranging the measurement noise frequency calculating part 71 and the natural vibration frequency calculating part 73 in the noise eliminating part 61 disposed as a functional block in the personal computer 42, both a measurement noise frequency and a natural vibration frequency can be acquired from raw data that is acquired through an actual test. Accordingly, also even in a case in which a natural frequency of a system including a force detector and a jig of a tester main body has not been checked in advance using another vibration detecting device, amplitude detection using the natural vibration frequency can be performed, and, even in a case in which measurement noise of a detector has not been checked in advance, an appropriate noise cutoff filter can be installed using a measurement noise frequency acquired from data that has been acquired through a test.

Description will be presented with reference to FIG. 6 again. A representative value calculated by the representative value calculating part 76 and an amplitude value calculated by the amplitude detecting part 64 are input to the ratio calculating part 77. The ratio calculating part 77 receives inputs of the representative value and the amplitude value and calculates a load natural vibration amplitude ratio. Then, the load natural vibration amplitude ratio calculated by the ratio calculating part 77 is input to the determination part 78.

In a case in which there is one representative value calculated by the representative value calculating part 76, the determination part 78 executes determination on the basis of one load natural vibration amplitude ratio acquired using the one representative value and an amplitude value. In the determination here, if the load natural vibration amplitude ratio exceeds a set threshold, a determination is made to evaluate the test result as defective regarding the test result evaluation, and a determination is made to evaluate the test result as good is made in a case in which the load natural vibration amplitude ratio does not exceed the threshold. A result of the determination output from the determination part 78 is displayed in the display device 51 by an operation of the display control part 69. In addition, a case in which there is one representative value calculated by the representative value calculating part 76, for example, is a case in which a representative value is calculated by the representative value calculating part 76 using the data period B as one piece of section data or a case in which a representative value of only initial section data (represented using reference numeral B1 in FIG. 4) when data of the data period B corresponding to one period of the natural vibration is set as section data is calculated by the representative value calculating part 76.

In a case in which there are a plurality of representative values calculated by the representative value calculating part 76, the determination part 78 executes determination on the basis of a plurality of load natural vibration amplitude ratios acquired using a representative value of each section and an amplitude value. As the determination made here, determination of two types is executed in which a determination is made to evaluate the test result as good in a case in which the load natural vibration amplitude ratio exceeds a threshold, and a determination is made to evaluate the test result as good in a case in which the load natural vibration amplitude ratio does not exceed the threshold, and comprehensive determination of whether or not there is a determination of being good with a predetermined ratio from the plurality of determination results is executed. A result of the comprehensive determination output from the determination part 78 is displayed in the display device 51 by an operation of the display control part 69. In addition, a case in which there are a plurality of representative values calculated by the representative value calculating part 76, for example, is a case in which representative values of a plurality of pieces of section data (three sections in FIG. 8) when data of the data period B corresponding to one period of the natural vibration is set as section data are calculated by the representative value calculating part 76 or a case in which a representative value of section data acquired by dividing the data period B into four parts is calculated by the representative value calculating part 76.

Whether one or a plurality of pieces of section data used for calculating a representative value by the representative value calculating part 76 is set can be determined by seeing the waveform of the data period B of actual test data. Particularly, since a wave height of a waveform corresponding to the initial period of the natural vibration tends to have a high wave height, in a case in which a wave height of a subsequent waveform cycle of the natural vibration is small, a representative value may be acquired from section data corresponding to the initial period, or a maximum value may be set as the representative value with the data of the data period B regarded as section data. In addition, in a case in which a waveform having periodicity is seen from the waveform of the data period B of actual test data, a representative value of a plurality of pieces of section data may be acquired.

In addition, regarding the test method evaluating method described above, although an example in which an amplitude value of the natural vibration is acquired by a user's manual operation and an example in which an amplitude value of the natural vibration is acquired using a program installed in a personal computer have been described, the calculation of a value based on the amplitude of the natural vibration is not limited to such examples. A value based on the amplitude of the natural vibration may be supplied using other techniques.

As described above, according to the test result evaluating method of the disclosure, a load natural vibration amplitude ratio that can be quantitatively acquired is employed as an index used for evaluating a test result, and, by presenting the load natural vibration amplitude ratio to the user, an objective evaluation of a test result can be executed. In addition, by displaying a result determined by the determination part 78 in the display device 51, no individual differences in the determination occur between users.

In the embodiment described above, although a high-speed tension test has been described, the disclosure can be applied for checking a force according to resonance having a likelihood of participating in a test subject with being superimposed on a test force set in a test such as a high-speed compression test in which a compressive load is applied to a test body such as concrete.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A test result evaluating method for evaluating a reliability of a test result in a material test in which a test force is applied to a test subject by driving a load mechanism, the test result evaluating method comprising:
    a representative value calculating process of setting data in a predetermined time as section data, and calculating a representative value of the section data, wherein the data in the predetermined time is comprised in test data acquired by a force detector during a time period in which the test force is applied to the test subject;
    a ratio calculating process of calculating a load natural vibration amplitude ratio that is a ratio between the representative value acquired in the representative value calculating process and a value based on an amplitude of a natural vibration; and
    a determination process of determining the reliability of the test result on the basis of the load natural vibration amplitude ratio.

2. The test result evaluating method according to claim 1, wherein the section data is data corresponding to a time of one period of the natural vibration superimposed on the test data.

3. The test result evaluating method according to claim 2, further comprising:
    an amplitude detecting process of calculating the value based on the amplitude of the natural vibration before the ratio calculating process.

4. The test result evaluating method according to claim 2, further comprising:
    a period determining process of acquiring one period of a waveform of the natural vibration according to a reciprocal of a natural vibration frequency superimposed on the test data before the representative value calculating process.

5. The test result evaluating method according to claim 1,
    wherein, in the representative value calculating process, representative values of a plurality of pieces of section data are calculated, and
    wherein, in the determination process, determination is executed on the basis of the load natural vibration amplitude ratio for each of the plurality of pieces of section data of which the representative values are calculated in the representative value calculating process, and comprehensive determination is executed using determination for each of the plurality of pieces of section data.

6. The test result evaluating method according to claim 5, further comprising:
an amplitude detecting process of calculating the value based on the amplitude of the natural vibration before the ratio calculating process.

7. The test result evaluating method according to claim 1, further comprising:
an amplitude detecting process of calculating the value based on the amplitude of the natural vibration before the ratio calculating process.

8. The test result evaluating method according to claim 1, further comprising:
a natural vibration frequency calculating process of acquiring a natural vibration frequency from the test data before the representative value calculating process.

9. A material tester comprising a control device that processes a signal detected by a force detector in a material test in which a test force is applied to a test subject by driving a load mechanism,
wherein the control device comprises a processor configured to execute a test result evaluating part including:
a representative value calculating part setting data in a predetermined time as section data, and calculating a representative value of the section data, wherein the data in the predetermined time is comprised in test data acquired by the force detector during a time period in which the test force is applied to the test subject; and
a ratio calculating part calculating a load natural vibration amplitude ratio that is a ratio between the representative value acquired by the representative value calculating part and a value based on an amplitude of a natural vibration.

10. The material tester according to claim 9,
wherein the test result evaluating part further includes a determination part determining reliability of a test result on the basis of the load natural vibration amplitude ratio.

11. The material tester according to claim 10,
wherein the representative value calculating part calculates representative values of a plurality of pieces of section data, and
wherein the determination part executes determination on the basis of the load natural vibration amplitude ratio for each of the plurality of pieces of section data of which the representative values are calculated by the representative value calculating part and executes comprehensive determination using determination for each of the plurality of pieces of section data.

12. The material tester according to claim 9,
wherein the section data is data corresponding to a time of one period of the natural vibration superimposed on the test data.

13. The material tester according to claim 12,
wherein the test result evaluating part further includes a period determining part acquiring one period of a waveform of the natural vibration according to a reciprocal of a natural vibration frequency superimposed on the test data.

14. The material tester according to claim 9,
wherein the test result evaluating part further includes an amplitude detecting part calculating the value based on the amplitude of the natural vibration.

15. The material tester according to claim 9,
wherein the processor further configured to execute a natural vibration frequency calculating part acquiring a natural vibration frequency from the test data.

* * * * *